(12) United States Patent
Lan et al.

(10) Patent No.: US 9,918,138 B2
(45) Date of Patent: Mar. 13, 2018

(54) METHOD FOR CONTROLLING MULTIMEDIA PLAYING, APPARATUS THEREOF AND STORAGE MEDIUM

(71) Applicant: Tencent Technology (Shenzhen) Company Limited, Shenzhen, Guangdong (CN)

(72) Inventors: Xiaoting Lan, Guangdong (CN); Yao Xu, Guangdong (CN); Pianpian Xu, Guangdong (CN)

(73) Assignee: TENCENT TECHNOLOGY (SHENZHEN) COMPANY LIMITED, Shenzen, P.R. (CN)

( * ) Notice: Subject to any disclaimer, the term of this patent is extended or adjusted under 35 U.S.C. 154(b) by 0 days.

(21) Appl. No.: 15/183,412

(22) Filed: Jun. 15, 2016

(65) Prior Publication Data

US 2016/0295294 A1  Oct. 6, 2016

Related U.S. Application Data

(63) Continuation of application No. PCT/CN2015/093036, filed on Oct. 28, 2015.

(30) Foreign Application Priority Data

Oct. 29, 2014 (CN) .......................... 2014 1 0596914

(51) Int. Cl.
*H04N 5/92* (2006.01)
*H04N 21/488* (2011.01)
(Continued)

(52) U.S. Cl.
CPC ....... *H04N 21/4884* (2013.01); *H04N 21/472* (2013.01); *H04N 21/485* (2013.01); *H04N 21/845* (2013.01)

(58) Field of Classification Search
CPC .... H04N 21/4884; H04N 21/472; H04N 5/85; H04N 9/8042; G11B 27/105; G11B 27/329; G11B 2220/2562
(Continued)

(56) References Cited

U.S. PATENT DOCUMENTS

2007/0040936 A1  2/2007  Park
2010/0146549 A1*  6/2010  Staunton-Lambert ............................ G06F 3/0482
725/40

(Continued)

FOREIGN PATENT DOCUMENTS

CN  1787630 A  6/2006
CN  1937732 A  3/2007
(Continued)

OTHER PUBLICATIONS

Office Action dated Oct. 17, 2016 for Chinese Application No. 201410596914.9, 17 pages.
(Continued)

*Primary Examiner* — William Tran
(74) *Attorney, Agent, or Firm* — Brinks Gilson & Lione

(57) ABSTRACT

A method for controlling multimedia playing, an apparatus thereof and a storage medium are provided according to the present disclosure, which relates to the field of terminal technology. The method includes: dividing subtitle information of a multimedia file into multiple subtitle segments, where each of the multiple subtitle segments corresponds to a time tag; triggering to play a selected subtitle segment of the subtitle information; obtaining a playing start time of the selected subtitle segment according to a time tag corresponding to the selected subtitle segment; and playing the multimedia file from the playing start time.

11 Claims, 9 Drawing Sheets

(51) Int. Cl.
*H04N 21/472* (2011.01)
*H04N 21/485* (2011.01)
*H04N 21/845* (2011.01)

(58) Field of Classification Search
USPC .......................................................... 386/244
See application file for complete search history.

(56) References Cited

U.S. PATENT DOCUMENTS

| | | | |
|---|---|---|---|
| 2011/0286715 A1* | 11/2011 | Zhang | ................ H04N 5/44513 386/230 |
| 2012/0047437 A1 | 2/2012 | Chan | |
| 2012/0151079 A1 | 6/2012 | Besehanic | |
| 2014/0320434 A1* | 10/2014 | Pantel | ..................... G06F 3/017 345/173 |

FOREIGN PATENT DOCUMENTS

| | | | |
|---|---|---|---|
| CN | 1975732 | A | 6/2007 |
| CN | 101131693 | A | 2/2008 |
| CN | 101790049 | A | 7/2010 |
| CN | 102290081 | A | 12/2011 |
| CN | 104090743 | A | 10/2014 |
| CN | 104967910 | A | 10/2015 |

OTHER PUBLICATIONS

International Search Report and Written Opinion received in PCT Application No. PCT/CN2015/093036 dated Feb. 3, 2016 (12 pages).
Summary of the International Search Report in PCT Application No. PCT/CN2015/093036 dated Feb. 3, 2016 (1 page).

* cited by examiner

METHOD FOR CONTROLLING MULTIMEDIA PLAYING, APPARATUS THEREOF AND STORAGE MEDIUM

CROSS REFERENCE OF RELATED APPLICATIONS

This application is a continuation of International Application No. PCT/CN2015/093036, filed on Oct. 28, 2015, which claims the priority to Chinese Patent Application No. 201410596914.9 titled "MULTIMEDIA PLAY PROGRESS CONTROL METHOD AND APPARATUS" and filed with the Chinese State Intellectual Property Office on Oct. 29, 2014, which are incorporated herein by reference in their entireties.

FIELD

The present disclosure relates to the field of terminal technology, especially to a method for controlling multimedia playing, an apparatus thereof and a storage medium.

BACKGROUND

With the development of terminal technology, an increasing number of users use terminals to play multimedia. In conventional technology, when using a terminal to play multimedia, a user can change a playing position of the multimedia by dragging the anchor in the playing progress bar to start a trial playing from the playing position where the anchor locates and view subtitles corresponding to the current position on a playing interface after multiple times trial playing and subtitle viewing, the user finds the desired subtitle, and the multimedia is played from the playing time corresponding to the position of the anchor, thereby realizing controlling a playing progress of the multimedia.

In realizing controlling the playing progress of the multimedia in conventional technology, the user needs to drag the anchor in the playing progress bar for multiple times to find a desired segment, which has a low operation efficiency and a poor interactivity and is not simple and convenient enough in practice.

SUMMARY

To solve the problem in conventional technology, a method for controlling multimedia playing, an apparatus thereof and a storage medium are provided according to the present disclosure.

A method for controlling multimedia playing is provided according to the present disclosure, which includes:

dividing subtitle information of a multimedia file into multiple subtitle segments, where each of the multiple subtitle segments corresponds to a time tag;

triggering to play a selected subtitle segment of the subtitle information;

obtaining a playing start time of the selected subtitle segment according to a time tag corresponding to the selected subtitle segment; and playing the multimedia file from the playing start time.

An apparatus for controlling multimedia playing is provided according to the present disclosure, which includes one or more processors and a storage medium in which operation instructions are stored. When the operation instructions in the storage medium are executed, the one or more processors are configured to perform the following steps:

dividing subtitle information of a multimedia file into multiple subtitle segments, where each of the multiple subtitle segments corresponds to a time tag;

triggering to play a selected subtitle segment of the subtitle information;

obtaining a playing start time of the selected subtitle segment according to a time tag corresponding to the selected subtitle segment; and playing the multimedia file from the playing start time.

A non-transitory computer readable storage medium is provided according to the present disclosure, in which computer executable instructions are stored, where the following steps are performed when the executable instructions are executed by a computer:

dividing subtitle information of a multimedia file into multiple subtitle segments, where each of the multiple subtitle segments corresponds to a time tag;

triggering to play a selected subtitle segment of the subtitle information;

obtaining a playing start time of the selected subtitle segment according to a time tag corresponding to the selected subtitle segment; and playing the multimedia file from the playing start time.

With the technical solutions according to the present disclosure, when subtitles are displayed, a user may select a subtitle segment and obtain the playing start time, corresponding to the subtitle segment, of the multimedia file according to the time tag corresponding to the subtitle segment, thereby realizing adjusting a playing progress of the multimedia file, which is flexible and has a high operation efficiency and a great interactivity in practice.

DETAILED DESCRIPTION

Some embodiments of the disclosure are described in detail hereinafter, so that the object, technical solutions and advantages of the invention may be clearer.

Some terms are described herein for better understanding the embodiments according to the present disclosure.

In the embodiments according to the present disclosure, a multimedia file may be a file with multiple mixed media capabilities, such as a video file or a audio file, and a subtitle file may be an annotative file for the multimedia file, which may be a file of Chinese and English subtitles file corresponding to a video file, or a lyric file of a song file.

Figure 1:
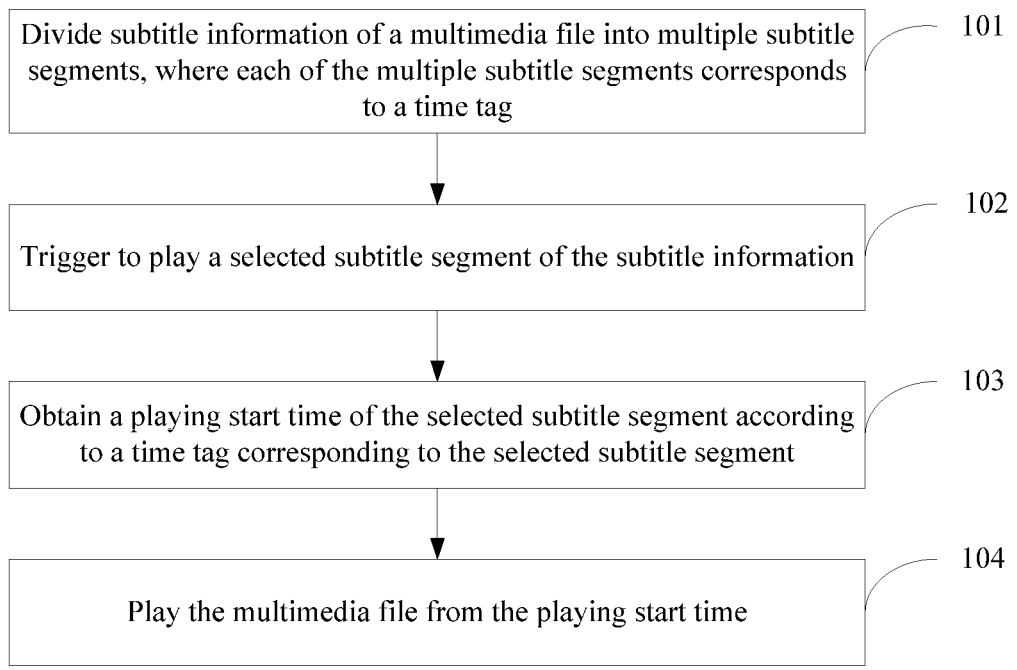
FIG. 1 is a flowchart of a method for controlling multimedia playing according to an embodiment of the present disclosure.

FIG. 1 is a flowchart of a method for controlling multimedia playing according to an embodiment of the present disclosure. An execution body of the method for controlling multimedia playing according to the embodiment is a terminal device, which may be a cellphone, a tablet computer or a desktop computer. As illustrated in FIG. 1, the method includes steps 101 to 104.

Step 101 includes dividing subtitle information of a multimedia file into multiple subtitle segments, where each of the multiple subtitle segments corresponds to a time tag.

The method according to the embodiment of the present disclosure may be implemented on a subtitle display interface of a multimedia file or on any other display interface, which is not limited in the embodiment.

In the embodiment of the present disclosure, it is assumed that the multimedia is a song file, and a subtitle file corresponding to the multimedia file is a lyric file. The lyric file corresponding to the multimedia file may include lyric text information and time tags, and the lyric file may be of a row format, a word format or a paragraph format, which is not limited specifically in the embodiment of the present disclosure. In a case the lyric file is of a row format, i.e., the lyric text information is divided by rows, a row of lyrics corresponds to a time tag, where the time tag includes a playing start time of the row of lyrics or includes a playing start time and a playing end time of the row of lyrics. According to the embodiments of the present disclosure, a time tag corresponding to a playing time is determined based on the playing time corresponding to the current playing progress of the multimedia file, so that a row of lyrics corresponding to the time tag, or the row of lyrics corresponding to the time tag and a predetermined row of lyrics before and after the row of lyrics corresponding to the time tag may be obtained, where the obtained lyrics are displayed on a lyric display interface.

The subtitle display interface may further include a playing progress bar, a play and pause control block and a control block for skipping to a previous or a next multimedia file, for indicating a playing progress of a multimedia file and controlling playing of a multimedia file, which is not limited specifically in the embodiment of the present disclosure.

Step 102 includes triggering to play a selected subtitle segment of the subtitle information.

In the embodiment of the present disclosure, the subtitle file is a lyric file, for example, and a segment of the subtitle information may be a row or a paragraph of lyrics on the lyric display interface, which is not limited specifically in the embodiment of the present disclosure.

In the embodiment of the present disclosure, it is assumed that the subtitle file is a lyric file, and a segment of the subtitle information may be a row or a paragraph of lyrics on the lyric display interface, which is not limited specifically in the embodiment of the present disclosure. In particular implementations, the text information of the lyrics may be divided into rows or paragraphs by adding row tags or paragraph tags, respectively, to the text information of the lyrics in the lyric file, i.e., the lyric file is of a row format or a paragraph format, so that the text information of the lyrics can respond to a playing triggering operation in form of rows or paragraphs after a terminal parses out the text information of the lyrics.

The playing triggering operation on the selected subtitle segment of the subtitle information may be a click, a double-click or a long-press. In the embodiment of the present disclosure, if a drag operation on the subtitle display interface is detected in the process of displaying the subtitle information, a subtitle alignment indicatrix and a skip option are displayed at a specified position on the subtitle display interface, where the subtitle alignment indicatrix is used to highlight subtitles corresponding to the skip option. On detecting a triggering operation on the skip option, it is determined that a playing triggering operation on the subtitles corresponding to the subtitle alignment indicatrix is detected.

Step 103 includes obtaining a playing start time of the selected subtitle segment according to a time tag corresponding to the selected subtitle segment.

In the embodiment, since a subtitle segment corresponds to a time tag and the time tag may include a playing start time of the subtitle segment or include the playing start time and a playing end time of the subtitle segment, the playing start time of the subtitle segment can be obtained according to the time tag.

Step 104 includes playing the multimedia file from the playing start time.

After the playing start time, corresponding to the selected subtitle segment, of the multimedia file is obtained, the terminal skips to the playing start time and plays the multimedia file, realizing a fast and efficient control on the playing progress of the multimedia file.

In the method according to the embodiment of the present disclosure, a user may select a subtitle segment when displaying subtitles, and obtain the playing start time, corresponding to the subtitle segment, of the multimedia file according to the time tag corresponding to the subtitle segment, thereby realizing adjusting the playing progress of the multimedia file, which is flexible and has a high operation efficiency and a great interactivity in practice.

If a drag operation is detected in when displaying the subtitle information, a subtitle alignment indicatrix and a skip option are displayed at a specified position on the subtitle display interface, where the subtitle alignment indicatrix is used to highlight subtitles corresponding to the skip option.

On detecting a triggering operation on the skip option, it is determined that a playing triggering operation on the subtitles corresponding to the subtitle alignment indicatrix is detected.

On detecting a triggering operation on the skip option, in a case that the subtitle alignment indicatrix corresponds to a row of subtitles, it is determined that a playing triggering operation on the row of subtitles is detected;

on detecting a triggering operation on the skip option, in a case that the subtitle alignment indicatrix corresponds to a blank area between two adjacent rows of subtitles, it is determined that a playing triggering operation on the first or the second of the two adjacent rows of subtitles is detected; or on detecting a triggering operation on the skip option, in a case that the subtitle alignment indicatrix corresponds to a paragraph of subtitles, it is determined that a playing triggering operation on the paragraph of subtitles is detected.

After the drag operation is finished, the displaying of the subtitle alignment indicatrix and the skip option may be stopped in a case that no triggering operation on the skip option is detected within a predetermined duration.

Based on the time tag corresponding to the selected subtitle segment, in the process of playing the multimedia file, the process of playing the multimedia file is terminated, a playing start time selected is skipped to and the multimedia file is played from the playing start time without any playing operations; or in a case that the process of playing the multimedia file is paused, a playing start time is skipped to and the multimedia file is played from the playing start time on receiving a playing instruction.

An optional embodiment of the present disclosure may be obtained by combining the optional technical solutions above arbitrarily, which is not described in detail herein.

Figure 2:
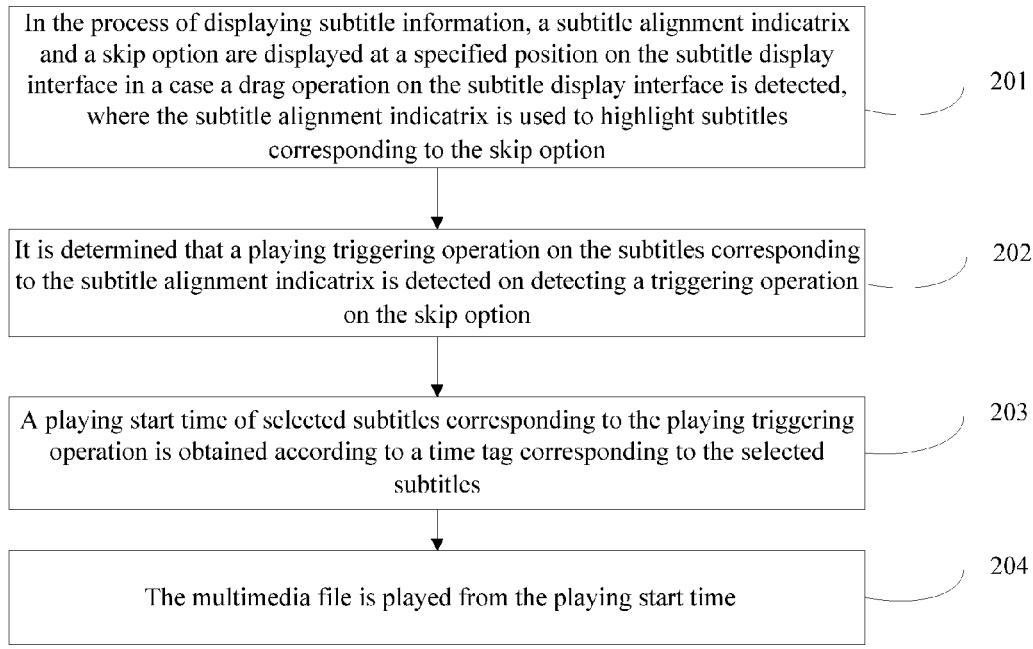
FIG. 2 is a flowchart of a method for controlling multimedia playing according to an embodiment of the present disclosure.

FIG. 2 is a flowchart of a method for controlling multimedia playing according to an embodiment of the present disclosure and the method may be applied to a terminal device, where the terminal device may be a cellphone, a tablet computer or a desktop computer. As illustrated in FIG. 2, the method includes steps 201 to 204.

In step 201, if a drag operation on a subtitle display interface is detected when displaying subtitle information, a subtitle alignment indicatrix and a skip option are displayed at a specified position on a subtitle display interface, where the subtitle alignment indicatrix is used to highlight subtitles corresponding to the skip option.

For example, multiple rows of subtitles of a subtitle file are displayed on the subtitle display interface. In the embodiment of the present disclosure, the drag operation on the subtitle display interface may be a dragging-upward operation or a dragging-downward operation. On a playing interface of a multimedia file, if a user wants to view subtitles before a current displaying time, the user may performs a dragging-downward operation on the subtitle display interface, and if the user wants to view subtitles after the current playing time, the user may perform a dragging-upward operation on the subtitle display interface. Upon detecting the drag operation on the subtitle display interface, a terminal displays a response of the subtitle display interface to the drag operation with an animation, for example, the subtitles rolling upward or downward based on the direction and speed of the drag operation. By the drag operation, subtitles the user wants to view may be selected, so that a playing start time of the subtitles selected may be obtained, thereby realizing a follow-up playing progress adjusting process.

Of course, in practical applications, the drag operation on the subtitle display interface may be varied as how to switch subtitles on the subtitle display interface varies. For example, only one row of subtitles are displayed on the subtitle display interface and subtitles on the subtitle display interface are switched by rolling left in the process of playing a multimedia file. Thus, in the case above, an animation of the subtitles rolling left or right may be displayed on detecting an operation of dragging the subtitle display interface left or right, which is not limited specifically in the embodiment of the present disclosure.

After the drag operation on the subtitle display interface is detected, the subtitle alignment indicatrix and the skip option are displayed at the specified position on the subtitle display interface, so that the user may find the selected subtitles with reference to the subtitle alignment indicatrix and start to play the multimedia file from the selected subtitles. For example, multiple rows of subtitles are displayed on the subtitle display interface and the specified position may be a position where one of the multiple rows of subtitles locate or any other arbitrarily specified position, which is not limited specifically in the embodiment of the present disclosure. The subtitle alignment indicatrix is used to highlight the subtitles corresponding to the skip option, which may be displayed on the subtitle display interface horizontally and in parallel with each of the multiple rows of subtitles. In the subtitle rolling process in response to the drag operation, when a row of subtitles roll close to the subtitle alignment indicatrix, the subtitle alignment indicatrix makes it clear to the user that the row of subtitles are the currently selected subtitles. The skip option may be on the left or right of the subtitle alignment indicatrix, so that the user may know the skip option is set for a row of subtitles corresponding to the subtitle alignment indicatrix. In a case that the subtitle alignment indicatrix is directed at a row of subtitles the user desires, the terminal may play the multimedia file in response to a triggering operation of the user on the skip option. The skip option may be of a triangular shape, which is not limited specifically in the embodiment of the present disclosure. Of course, the terminal may also play the multimedia file in response to a triggering operation of the user on subtitles corresponding to the subtitle alignment indicatrix, which is not limited specifically in the embodiment of the present disclosure.

Figure 3A:
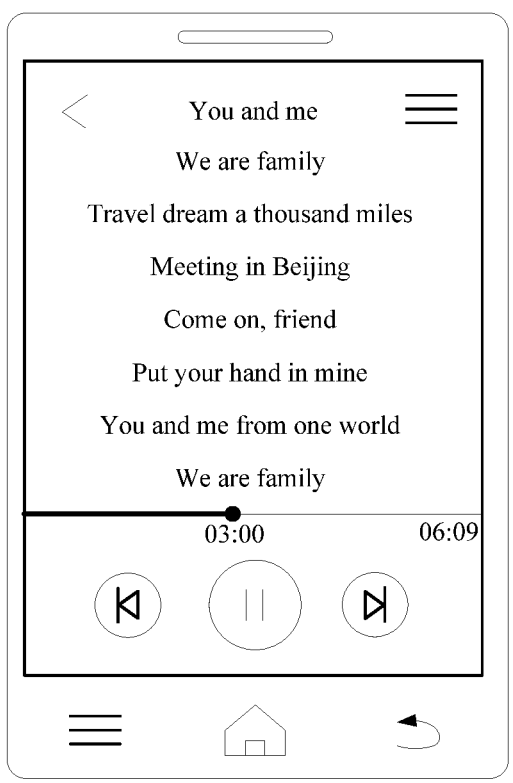
FIG. 3a and FIG. 3b are schematic diagrams of a subtitle display interface according to an embodiment of the present disclosure.
Figure 3B:
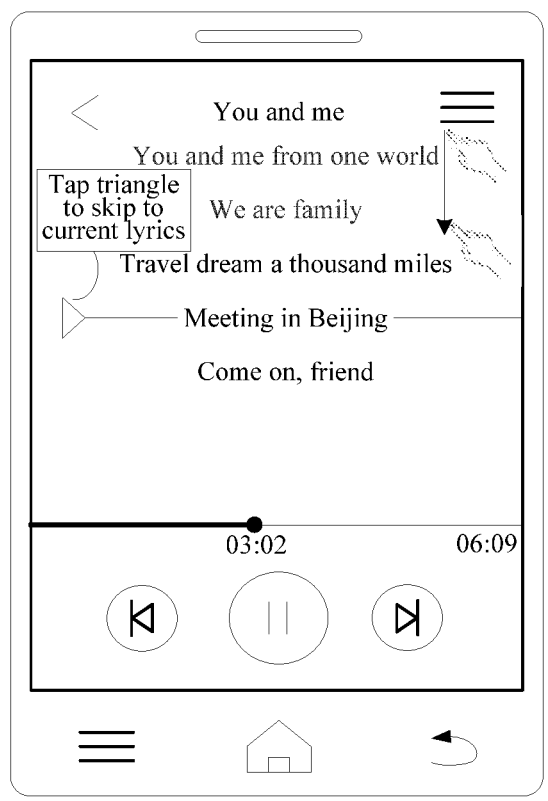

FIG. 3a and FIG. 3b are schematic diagrams of a subtitle display interface according to an embodiment of the present disclosure, where the subtitle file is a lyric file, for example. As illustrated in FIG. 3a, multiple rows of lyrics are displayed on the lyric display interface, and a name of the multimedia file, a playing process bar, a playing time, a play and pause control block and a control block for skipping to a previous or a next multimedia file are displayed as well. As illustrated in FIG. 3b, after a user performs a dragging-downward operation on the lyric display interface, lyrics on the lyric display interface roll downward, a subtitle alignment indicatrix is displayed in the middle of the lyric display interface laterally and a skip option is displayed on the left of the subtitle alignment indicatrix.

It should be noted that, in practical applications, prompting text information may be displayed near the subtitle alignment indicatrix and the skip option within a predetermined duration after displaying the subtitle alignment indicatrix and the skip option, such as "tap the small triangle to skip to current lyrics" as illustrated in FIG. 3b, so that the user can know functions of the subtitle alignment indicatrix and the skip option.

On the subtitle display interface, subtitles in a specified area corresponding to the subtitle alignment indicatrix are highlighted on detecting the drag operation. For example, a transparency of part of a background image in the specified area on the subtitle display interface is increased or a font and a colour of texts in a segment corresponding to the subtitle alignment indicatrix are accentuated, so that subtitles in the specified area may be highlighted. A size of the specified area is not limited specifically in the embodiment of the present disclosure. As illustrated in FIG. 3b, the font and the color of the texts in the segment corresponding to the subtitle alignment indicatrix are accentuated. Of course, the subtitles may be highlighted by zooming in the font of the subtitles in the specified area, which is not limited specifically in the embodiment of the present disclosure.

In step 202, it is determined that a playing triggering operation on the subtitle corresponding to the subtitle alignment indicatrix is detected on detecting a triggering operation on the skip option.

Figure 4A:
FIG. 4a to FIG. 4c are schematic diagrams of a subtitle display interface according to an embodiment of the present disclosure.
Figure 4B:
Figure 4C:

FIG. 4a to FIG. 4c are schematic diagrams of a subtitle display interface according to an embodiment of the present disclosure. Optionally, as illustrated in FIG. 4a to FIG. 4c, that it is determined that a playing triggering operation on the subtitle corresponding to the subtitle alignment indicatrix is detected on detecting a triggering operation on the skip option may include the following three situations.

First Situation

On detecting a triggering operation on the skip option, in a case that the subtitle alignment indicatrix corresponds to a row of subtitles, it is determined that a playing triggering operation on the row of subtitles is detected.

In a case the subtitle alignment indicatrix corresponds to a row of subtitles, i.e., the row of subtitles just roll to the subtitle alignment indicatrix when subtitle rolling finishes, it is determined a playing triggering operation on the row of subtitles is detected. As illustrated in FIG. 4a, since the subtitle alignment indicatrix corresponds to lyrics "Meeting in Beijing" of a song file, it is determined that a playing triggering operation on the lyrics "Meeting in Beijing" is detected.

Second Situation

On detecting a triggering operation on the skip option, in a case that the subtitle alignment indicatrix corresponds to a blank area between two adjacent rows of subtitles, it is determined that a playing triggering operation on the first or the second of the two adjacent rows of subtitles is detected.

In a case that the subtitle alignment indicatrix corresponds to a blank area between two adjacent rows of subtitles, i.e., the subtitle alignment indicatrix just roll to the blank area between the two adjacent rows of subtitles when subtitle rolling is finishes, it is determined that a playing triggering operation on one of the two adjacent rows of subtitles is detected. In practical implementations, a choice in the situation may be preset by technicians, or options for the situation may be provided for a user so that settings may be made according to a choice of the user. As illustrated in FIG. 4b, since the subtitle alignment indicatrix corresponds to the blank area between lyrics "Meeting in Beijing" and "Come on, friend", it can be determined that a playing triggering operation on the lyrics "Meeting in Beijing" or "Come on, friend" is detected.

Third Situation

On detecting the triggering operation on the skip option, in a case that the subtitle alignment indicatrix corresponds to a paragraph of subtitles, it is determined that a playing triggering operation on the paragraph of subtitles is detected.

In a case that a segment of the subtitle information is a paragraph of subtitles on the subtitle display interface and the subtitle alignment indicatrix is directed at a part of the paragraph of subtitles, it is determined that a playing triggering operation on the paragraph of subtitles is detected, which may be regarded as that a playing triggering operation on the first row of the paragraph of subtitles is detected. As illustrated in FIG. 4c, where a paragraph of lyrics is marked with a dashed box on the lyric display interface. Since the subtitle alignment indicatrix is across the dashed box, it is determined that a playing triggering operation on the paragraph of lyrics is detected. It should be noted that the dashed box in FIG. 4c is only used to auxiliarily illustrate a paragraph of lyrics on the lyric display interface. In practical applications, the dashed box may be displayed or not displayed when the drag operation is finished, which is not limited specifically in the embodiment of the present disclosure.

Optionally, in order not to affect normal playing of the multimedia file, after the subtitle alignment indicatrix and the skip option are displayed at the specified position on the subtitle display interface, the displaying of the subtitle alignment indicatrix and the skip option may be stopped in a case that no playing triggering operation on the skip option is detected within a predetermined duration after the drag operation is finished. The predetermined duration is a short duration, such as 1s or 2s, which is not limited in the embodiment.

And, a subtitle display interface corresponding to a current multimedia playing progress is resumed after the displaying of the subtitle alignment indicatrix and the skip option is canceled.

In a case that the drag operation finishes in a multimedia displaying progress, subtitles corresponding to the current playing progress are displayed on the subtitle display interface according to the current playing progress.

In the embodiment of the present disclosure, in order not to affect normal playing of the multimedia file, if a drag operation on the subtitle display interface is detected when playing the multimedia file, the terminal does not terminate the multimedia playing progress, before skipping to subtitles corresponding to the subtitle alignment indicatrix and playing on detecting the playing triggering operation on the skip option. Thus, the multimedia playing progress is affected in a case that no playing triggering operation on the skip option is detected within the predetermined duration. According to a playing progress of the multimedia file, multiple rows of subtitles, corresponding to the playing progress, of the subtitle file are displayed on the subtitle display interface.

In a case that the drag operation finishes when a scenario that multimedia playing is paused, a subtitle display interface before the drag operation starts is resumed.

In a case that the process of displaying the multimedia file is paused, the subtitles corresponding to a time when the multimedia file is paused are displayed on the subtitle display interface before the drag operation on the subtitle display interface is detected. Thus, in a case that no playing triggering operation on the skip option is detected within the predetermined duration, multiple rows of subtitle corresponding to the playing progress are selected from the subtitle file for display according to the time when the multimedia file is paused, i.e., the subtitle interface before the drag operation starts is resumed.

In step 203, a playing start time of selected subtitles corresponding to the playing triggering operation is obtained according to a time tag corresponding to the selected subtitles.

Upon detecting a playing triggering operation on a row of subtitles, it is needed to obtain a playing start time of the row of subtitles from the subtitle file corresponding to the multimedia file. For example, the terminal may parse the subtitle file to obtain a list, where each row in the list includes a playing start time and subtitle information of a row of subtitles, so that a playing start time of a row of subtitles corresponding to the subtitle alignment indicatrix may be obtained from the list.

Upon detecting a playing triggering operation on a paragraph of subtitles, it is needed to obtain a playing start time of the paragraph of subtitles from the subtitle file corresponding to the multimedia file. For example, the terminal may parse the subtitle file to obtain a list, where each row in the list includes a playing start time and subtitle information of a paragraph of subtitles, so that a playing start time of a paragraph of subtitles corresponding to the subtitle alignment indicatrix may be obtained from the list. Of course, upon detecting a playing triggering operation on a paragraph of subtitles, it may be regard as that a playing triggering operation on the first row of the paragraph of subtitles is detected, so that a playing start time of the first row of subtitles may be obtained, which is not limited specifically in the embodiment of the present disclosure.

In step 204, the multimedia file is played from the playing start time.

Since on the playing interface of the multimedia file, the multimedia file may be being played or paused before performing the drag operation, the process of playing the multimedia file from the playing start time may include: if in the process of playing the multimedia file, terminating the process of playing the multimedia file, skipping to the playing start time and playing the multimedia file from the playing start time without any playing operations; or, if the process of playing the multimedia file is paused, skipping to the playing start time and playing the multimedia file from the playing start time on receiving a playing instruction. Through the process above, playing from the subtitles corresponding to the subtitle alignment indicatrix, i.e., playing from subtitles selected by the user, is realized.

In the method according to the embodiment of the present disclosure, when subtitles are displayed, a user may select a subtitle segment and obtain the playing start time, corresponding to the subtitle segment, of the multimedia file according to the time tag corresponding to the subtitle segment, thereby realizing adjusting a playing progress of the multimedia file, which is flexible and has a high operation efficiency and a great interactivity in practice.

Figure 5:
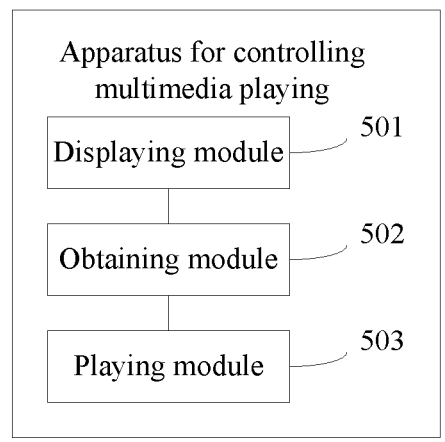
FIG. 5 is a structural diagram of an apparatus for controlling multimedia playing according to an embodiment of the present disclosure.

FIG. 5 is a structural diagram of an apparatus for controlling multimedia playing according to an embodiment of the present disclosure, which is configured to perform the method for controlling multimedia playing according to the embodiment illustrated in FIG. 1 or 2. The apparatus may be included in a terminal device, where the terminal device may be a cellphone, a tablet computer or a desktop computer. As illustrated in FIG. 5, the apparatus includes:

a displaying module 501, configured to display subtitle information on a subtitle display interface according a subtitle file corresponding to a multimedia file;

an obtaining module 502, configured to obtain a playing start time of a segment corresponding to a playing triggering operation from the subtitle information on detecting the playing triggering operation on the segment of the subtitle information; and a playing module 503, configured to play the multimedia file from the playing start time.

Figure 6:
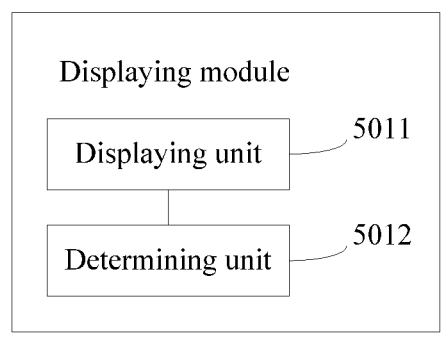
FIG. 6 is a structural diagram of a display module according to an embodiment of the present disclosure.

Optionally, as illustrated in FIG. 6, the displaying module 501 includes:

a displaying unit 5011, configured to display a subtitle alignment indicatrix and a skip option at a specified position on the subtitle display interface in a case that a drag operation on the subtitle display interface is detected in the process of displaying the subtitle information, where the subtitle alignment indicatrix is used to highlight subtitles corresponding to the skip option; and a determining unit 5012, configured to determine that a playing triggering operation on subtitles corresponding to the subtitle alignment indicatrix is detected on detecting a triggering operation on the skip option.

Optionally, the determining unit 5012 is configured to determine that the playing triggering operation on a row of subtitles is detected on detecting a triggering operation on the skip option, in a case that the subtitle alignment indicatrix corresponds to the row of subtitles; determine that the playing triggering operation on one of two adjacent rows of subtitles on detecting the triggering operation on the skip option, in a case that the subtitle alignment indicatrix corresponds to a blank area between the two adjacent rows of subtitles; or, determine that the playing triggering operation on a paragraph of subtitles is detected on detecting the triggering operation on the skip option, in a case that the subtitle alignment indicatrix corresponds to the paragraph of subtitles.

Optionally, the displaying unit 5011 is configured to stop displaying the subtitle alignment indicatrix and the skip option in a case that no triggering operation on the skip option is detected within a predetermined duration after the drag operation is finished.

Figure 7:
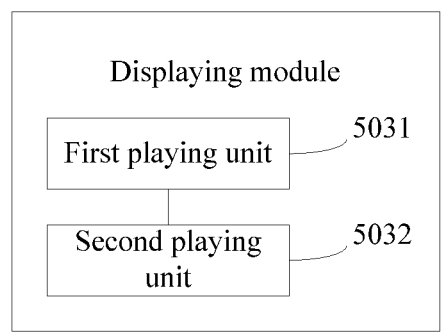
FIG. 7 is a structural diagram of a playing module according to an embodiment of the present disclosure.

Optionally, as illustrated in FIG. 7, the playing module 503 includes:

a first playing unit 5031, configured to, in the process of playing the multimedia file, terminate a current multimedia playing progress, skip to the playing start time and playing the multimedia file from the playing start time without any playing operations; or a second playing unit 5032, configured, in a case that the process of playing the multimedia file is paused, skip to the playing start time and play the multimedia file from the playing start time on receiving a playing instruction.

With the apparatus according to the embodiment of the present disclosure, when subtitles are displayed, a user may select a subtitle segment and obtain the playing start time, corresponding to the subtitle segment, of the multimedia file according to the time tag corresponding to the subtitle segment, thereby realizing adjusting a playing progress of the multimedia file, which is flexible and has a high operation efficiency and a great interactivity in practice.

Figure 8:
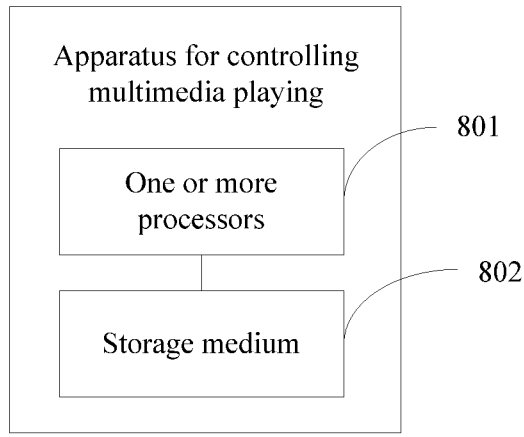
FIG. 8 is a structural diagram of a terminal for controlling multimedia playing according to an embodiment of the present disclosure.

Reference is made to FIG. 8, which illustrates an apparatus for controlling multimedia playing according to an embodiment of the present disclosure, which may include: one or more processors 801 and a storage medium 802 in which operation instructions are stored. When the operation instructions in the storage medium are executed, the one or more processors 801 are configured to perform the following steps:

dividing subtitle information of a multimedia file into multiple subtitle segments, where each of the multiple subtitle segments corresponds to a time tag;

triggering to play a selected subtitle segment of the subtitle information;

obtaining a playing start time of the selected subtitle segment according to a time tag corresponding to the selected subtitle segment; and playing the multimedia file from the playing start time.

Optionally, in obtaining the playing start time of the selected subtitle segment according to the time tag corresponding to the selected subtitle segment, the one or more processors 801 may be configured to perform the following:

parsing the subtitle information, to obtain a correspondence list of the multiple subtitle segments of the subtitle information and time tags; and querying for the time tag corresponding to the selected subtitle segment according to the correspondence list, to obtain the playing start time of the selected subtitle segment.

Optionally, in triggering to play the selected subtitle segment of the subtitle information, the one or more processors 801 may be configured to perform the following:

performing a drag operation on a subtitle display interface and displaying a subtitle alignment indicatrix and a skip option at a specified position on the subtitle display interface in the process of displaying the subtitle information, where the subtitle alignment indicatrix is used to highlight a subtitle segment corresponding to the skip option; and triggering the skip option and determining the subtitle segment corresponding to the skip option to be the selected subtitle segment.

Optionally, the one or more processors 801 may be further configured to perform the following:

determining a row of subtitles to be the selected subtitle segment on triggering the skip option, in a case the subtitle alignment indicatrix corresponds to the row of subtitles;

determining the first or the second of two adjacent rows of subtitles to be the selected subtitle segment on triggering the skip option, in a case the subtitle alignment indicatrix corresponds to a blank area between the two adjacent rows of subtitles; or determining a paragraph of subtitles to be the selected subtitle segment on triggering the skip option, in a case the subtitle alignment indicatrix corresponds to the paragraph of subtitles.

Optionally, the one or more processors 801 may be further configured to perform the following:

stopping displaying the subtitle alignment indicatrix and the skip option in a case the skip option is not triggered within a predetermined duration after the drag operation is finished.

Figure 9:
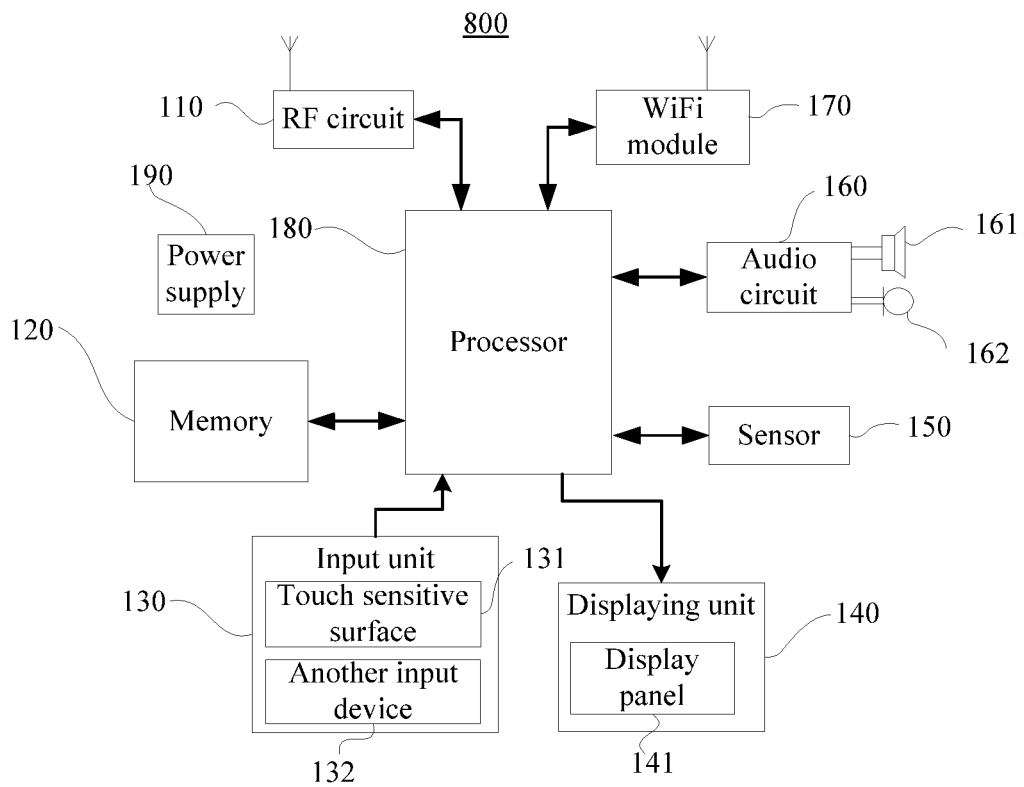
FIG. 9 is a structural diagram of a terminal for controlling multimedia playing according to an embodiment of the present disclosure.

Reference is made to FIG. 9, which is a structural diagram of a terminal related to the embodiments according to the present disclosure, where the terminal may be configured to implement the methods for controlling multimedia playing according to the embodiments above.

The terminal 800 may include a RF (Radio Frequency) circuit 110, a memory 120 including one or more computer readable storage media, an input unit 130, a displaying unit 140, a sensor 150, an audio circuit 160, a WiFi (Wireless Fidelity) module 170, a processor 180 including one or more processing cores and a power supply 190. Those in the art can understand the structure of the terminal illustrated in FIG. 8 is not construed as limiting the terminal, where the number of components included in the terminal may be more or less than that as illustrated in FIG. 8, some components may be combined or the components may be arranged differently.

The RF circuit 110 may be configured to receive and send a signal in the process of receiving and sending information or calling, particularly, receiving downlink information of a base station and transferring the downlink information to the processor 180 including one or more processing cores for processing; and, in addition, send uplink-related data to the base station. Generally, the RF circuit 110 includes but is not limited to an antenna, at least one amplifier, a tuner, one or more oscillators, a subscriber identity module (SIM) card, a transceiver, a coupler, an LNA (Low Noise Amplifier) and a duplexer. Besides, the RF circuit 110 may further communicate with another device through a wireless communications network. The wireless communications network may adopt any communications standard or protocol, which includes but is not limited to GSM (Global System of Mobile communication), GPRS (General Packet Radio Service), CDMA (Code Division Multiple Access), WCDMA (Wideband Code Division Multiple Access), LTE (Long Term Evolution), e-mail and SMS (Short Messaging Service).

The memory 120 may be configured to store software programs and modules, and the processor 180 performs various functional applications and data processing by running the software programs and modules stored in the memory 120. The memory 120 may mainly include a program storage zone and a data storage zone, where operating systems, applications programs required by at least one function (such as an audio playing function and an image playing function) may be stored in the program storage zone and data (such as audio data and a phone directory) created in the usage of the terminal 800 may be stored in the data storage zone. Besides, the memory 120 may include a high-speed random access memory, or include a nonvolatile memory, such as at least one disk memory, a flash memory or any other nonvolatile solid memory. Accordingly, the memory 120 may further include a memory controller, to provide an access to the memory for the processor 180 and the input unit 130.

The input unit 130 may be configured to receive input figure or character information and generate a keyboard signal input, a mouse signal input, an operating lever, an optical signal input or a trackball signal input, which is related to user setting and function control. The input unit 130 may include a touch sensitive surface 131 and another input device 132. The touch sensitive surface 131, which may be called a touch display screen or a touch pad, may collect an operation thereon or nearby (for example, an operation of a user with any appropriate object or accessory such as a finger or a touch pen on or near the touch sensitive surface 131) and drive a corresponding connection device according to a preset procedure. Optionally, the touch sensitive surface 131 may include a touch detecting apparatus and a touch controller. The touch detecting apparatus detects a position of a touch operation by a user and a signal brought in by the touch operation, and sends the signal to the touch controller. The touch controller receives touch information from the touch detecting apparatus, converts the touch information into a coordinate of a touch point, sends the coordinate of the touch point to the processor 180, and receives and executes a command from the processor 180. Besides, the touch sensitive surface 131 may be divided into multiple types of resistive, capacitive, infrared and surface acoustic wave. In addition to the touch sensitive surface 131, the input unit 130 may further include another input device 132. The another input device 132 may include but not be limited to one or more of a physical keyboard, a functions button (such as a volume control button and a switch button), a trackball, a mouse and an operating lever.

The displaying unit 140 may be configured to display information input by the user or provided for the user and various graphic user interfaces of the terminal 800, where the graphic user interfaces may be formed by images, texts, icons, videos and arbitrary combinations thereof. The displaying unit 140 may include a display panel 141, and optionally, the display panel 141 may be configured with a LCD (Liquid Crystal Display) or an OLED (Organic Light-Emitting Diode). Furthermore, the touch sensitive surface 131 may cover the display panel 141. After detecting a touch operation thereon or nearby, the touch sensitive surface 131 sends the touch operation to the processor 180 for determining a type of the touch event, and the processor 180 provides a corresponding visual output on the display panel 141 according to the type of the touch event. Although the touch sensitive 131 and the display panel 141 realize input and output functions as two independent components as is illustrated in FIG. 8, the touch sensitive 131 and the display panel 141 may be integrated together to realize the input and the output functions in some embodiments.

The terminal 800 may further include at least one kind of sensors 150, such as a light sensor, a motion sensor and any other sensor. The light sensor may include an environmental light sensor and a proximity sensor. The environmental light sensor can adjust a lightness of the display panel 141 depending on lightness or darkness of an environmental light, and the proximity sensor can turn off a backlight of the display panel 141 when the terminal is moved close to an ear. As one of the motion sensors, a gravity acceleration sensor can detect values of accelerations in various directions (generally in three axes), and detect a value and a direction of a gravity when being motionless, which may be applied to applications of recognizing a gesture of a cellphone (such as switching between landscape mode and portrait mode, related games and magnetometer calibration) and related functions of vibration recognition (such as a pedometer and a knock). The terminal 800 may be configured with any other sensor such as a gyroscope, a barometer, a hygrometer, a thermometer and an infrared sensor, which is not described herein.

The audio circuit 160, a speaker 161 and a microphone 161 may provide an audio interface between the user and the terminal 800. The audio circuit 160 may transmit an electrical signal converted from received audio data to the speaker 161, and the speaker 161 converts the electrical signal into an acoustical signal and outputs the acoustical signal. On the other hand, the microphone 161 converts a collected acoustical signal into an electrical signal; the audio circuit 160 receives the electrical signal, converts the electrical signal into audio data and sends the audio data to the processor 180; and after processing the audio data, the processor 180 sends the audio data to another terminal or inputs the audio data to the memory 120 for further processing. The audio circuit 160 may include an earphone jack, to provide communications between a peripheral earphone and the terminal 800.

WiFi is a short distance wireless transmission technology. The terminal 800 may help a user receive and send e-mails, browse webpages and access streaming media with the WiFi module 170, which provides an access to wireless boardband internet for the user. Although the WiFi module 170 is illustrated in FIG. 8, it is understood it is not a necessary part of the terminal 800 and can be definitely omitted without deviating from the scope of the essence of the invention.

The processor 180 is a control center of the terminal 800, which connects all parts of the cellphone through interfaces and circuits, performs the functions of the terminal 800 and processes data by running or executing the software programs or modules stored in the memory 120 and calling data stored in the memory 120, thereby realizing an overall monitoring on the cellphone. Optionally, the processor 180 may include one or more processing cores. Preferably, the processor 180 may be integrated with an application processor and a modulation/demodulation processor, where the application processor is mainly configured to process the operating systems, user interfaces and applications and the modulation/demodulation processor is mainly configured to process wireless communications. It is understood the modulation/demodulation processor may not be integrated into the processor 180.

The terminal 800 further includes a power supply 190 (for example, a battery) to supply the components with power. Optionally, the power supply may be logically connected to the processor through a power management system, thereby realizing functions of managing charging and discharging and power consumption management with the power management system. The power supply 190 may further include one or more DC (Direct Current) or AC (Alternative Current) power supplies, recharging systems, power supply failure detection circuits, power converters or inverters and power supply status indicators.

Although not illustrated, the terminal 800 may further include a camera or a Bluetooth module, which is not described herein. In the embodiment, the displaying unit of the terminal is a touch screen monitor. The terminal also includes a memory and one or more programs, where the one or more programs are stored in the memory and configured to be executed by one or more processors. The one or more programs include instructions for performing the following operations:

dividing subtitle information of a multimedia file into multiple subtitle segments, where each of the multiple subtitle segments corresponds to a time tag;

triggering to play a selected subtitle segment of the subtitle information;

obtaining a playing start time of the selected subtitle segment according to a time tag corresponding to the selected subtitle segment; and playing the multimedia file from the playing start time.

With the above assumed to be a first possible implementation, in a second possible implementation based on the first possible implementation, the memory of the terminal may further include instructions for performing the following operations:

parsing the subtitle information, to obtain a correspondence list of the multiple subtitle segments of the subtitle information and time tags; and querying for the time tag corresponding to the selected subtitle segment according to the correspondence list, to obtain the playing start time of the selected subtitle segment.

In a third possible implementation based on the first or the second possible implementation, the memory of the terminal may further include instructions for performing the following operations:

performing a drag operation on a subtitle display interface and displaying a subtitle alignment indicatrix and a skip option at a specified position on the subtitle display interface in the process of displaying the subtitle information, where the subtitle alignment indicatrix is used to highlight a subtitle segment corresponding to the skip option; and triggering the skip option and determining the subtitle segment corresponding to the skip option to be the selected subtitle segment.

In a fourth possible implementation based on the third possible implementation, the memory of the terminal may further include instructions for performing the following operations:

determining a row of subtitles to be the selected subtitle segment on triggering the skip option, in a case the subtitle alignment indicatrix corresponds to the row of subtitles;

determining the first or the second of two adjacent rows of subtitles to be the selected subtitle segment on triggering the skip option, in a case the subtitle alignment indicatrix corresponds to a blank area between the two adjacent rows of subtitles; and determining a paragraph of subtitles to be the selected subtitle segment on triggering the skip option, in a case the subtitle alignment indicatrix corresponds to the paragraph of subtitles.

In a fifth possible implementation based on the third possible implementation, the memory of the terminal may further include instructions for performing the following operations:

stopping displaying the subtitle alignment indicatrix and the skip option in a case the skip option is not triggered within a predetermined duration after the drag operation is finished.

With the terminal according to the embodiment of the present disclosure, when subtitles are displayed, a user may select a subtitle segment and obtain the playing start time, corresponding to the subtitle segment, of the multimedia file according to the time tag corresponding to the subtitle segment, thereby realizing adjusting a playing progress of the multimedia file, which is flexible and has a high operation efficiency and a great interactivity in practice.

A computer readable storage medium is provided according to an embodiment of the present disclosure, where the computer readable medium may be the computer readable storage medium included in the memory according to the embodiments above or a separate computer readable storage medium which is not assembled into a terminal. One or more programs are stored in the computer readable medium, and the one or more programs are executed by one or more processors to perform a method for controlling multimedia playing, where the method includes:

dividing subtitle information of a multimedia file into multiple subtitle segments, where each of the multiple subtitle segments corresponds to a time tag;

triggering to play a selected subtitle segment of the subtitle information;

obtaining a playing start time of the selected subtitle segment according to a time tag corresponding to the selected subtitle segment; and playing the multimedia file from the playing start time.

With the above assumed to be a first possible implementation, in a second possible implementation based on the first possible implementation, the memory of the terminal may further include instructions for performing the following operations:

parsing the subtitle information, to obtain a correspondence list of the multiple subtitle segments of the subtitle information and time tags; and querying for the time tag corresponding to the selected subtitle segment according to the correspondence list, to obtain the playing start time of the selected subtitle segment.

In a third possible implementation based on the first or the second possible implementation, the memory of the terminal may further include instructions for performing the following operations:

performing a drag operation on a subtitle display interface and displaying a subtitle alignment indicatrix and a skip option at a specified position on the subtitle display interface in the process of displaying the subtitle information, where the subtitle alignment indicatrix is used to highlight a subtitle segment corresponding to the skip option; and triggering the skip option and determining the subtitle segment corresponding to the skip option to be the selected subtitle segment.

In a fourth possible implementation based on the third possible implementation, the memory of the terminal may further include instructions for performing the following operations:

determining a row of subtitles to be the selected subtitle segment on triggering the skip option, in a case the subtitle alignment indicatrix corresponds to the row of subtitles;

determining the first or the second of two adjacent rows of subtitles to be the selected subtitle segment on triggering the skip option, in a case the subtitle alignment indicatrix corresponds to a blank area between the two adjacent rows of subtitles; or determining a paragraph of subtitles to be the selected subtitle segment on triggering the skip option, in a case the subtitle alignment indicatrix corresponds to the paragraph of subtitles.

In a fifth possible implementation based on the third possible implementation, the memory of the terminal may further include instructions for performing the following operations:

stopping displaying the subtitle alignment indicatrix and the skip option in a case the skip option is not triggered within a predetermined duration after the drag operation is finished.

With the computer readable storage medium according to the embodiment of the present disclosure, when subtitles are displayed, a user may select a subtitle segment and obtain the playing start time, corresponding to the subtitle segment, of the multimedia file according to the time tag corresponding to the subtitle segment, thereby realizing adjusting a playing progress of the multimedia file, which is flexible and has a high operation efficiency and a great interactivity in practice.

A graphic user interface is provided according to an embodiment of the present disclosure, where the graphic user interface is applicable to a terminal, where the terminal includes a touch screen monitor, a memory and one or more processors configured to execute one or more programs. The graphic user interface is configured to perform the following operations:

dividing subtitle information of a multimedia file into multiple subtitle segments, where each of the multiple subtitle segments corresponds to a time tag;

triggering to play a selected subtitle segment of the subtitle information;

obtaining a playing start time of the selected subtitle segment according to a time tag corresponding to the selected subtitle segment; and playing the multimedia file from the playing start time.

With the graphic user interface according to the embodiment of the present disclosure, when subtitles are displayed, a user may select a subtitle segment and obtain the playing start time, corresponding to the subtitle segment, of the multimedia file according to the time tag corresponding to the subtitle segment, thereby realizing adjusting a playing progress of the multimedia file, which is flexible and has a high operation efficiency and a great interactivity in practice.

It should be noted that the division of the functional modules above of the apparatus for controlling multimedia playing in controlling the multimedia playing progress is only described for example. In practical applications, the functions may be achieved by being distributed to different functional modules, i.e., an inner structure of the apparatus is divided into different functional modules to achieve all or part of the functions above. Besides, the apparatus for controlling multimedia playing is of the same idea as the method for controlling multimedia playing, and reference may be made to the method embodiments for a specific implementation process thereof, which is not described herein.

The serial numbers of the embodiments according to the present disclosure are only for ease of description, rather than represent a rank of qualities of the embodiments.

Those in the art shall understand that all or part of the steps according to the embodiments above may be performed by hardware, or by related hardware under instructions of a program. The program may be stored in a computer readable storage medium, where the storage medium above may be a read-only memory, a magnetic disk or an optical disk.

The embodiments above are only some preferred embodiment of the disclosure and are not intended to limit the disclosure. Any modifications, equivalents or improvements made within the spirit and principle of the invention shall fall within the scope of the disclosure.

The invention claimed is:

1. A method for controlling multimedia playing, comprising:
dividing subtitle information of a multimedia file into a plurality of subtitle segments, wherein each of the plurality of subtitle segments corresponds to a time tag;
triggering to play a selected subtitle segment of the subtitle information;
obtaining a playing start time of the selected subtitle segment according to a time tag corresponding to the selected subtitle segment; and
playing the multimedia file from the playing start time,
wherein triggering to play a selected subtitle segment of the subtitle information comprises:
performing a drag operation on a subtitle display interface and displaying a subtitle alignment indicatrix and a skip option at a specified position on the subtitle display interface in a process of displaying the subtitle information, wherein the subtitle alignment indicatrix is used to highlight a subtitle segment corresponding to the skip option, and wherein the displaying a subtitle alignment indicatrix and a skip option at a specified position on the subtitle display interface in a process of displaying the subtitle information comprises displaying prompting text information near the subtitle alignment indicatrix and the skip option within a predetermined duration after displaying the subtitle alignment indicatrix and the skip option; and
triggering the skip option and determining the subtitle segment corresponding to the skip option to be the selected subtitle segment.

2. The method according to claim 1, wherein obtaining a playing start time of the selected subtitle segment according to a time tag corresponding to the selected subtitle segment comprises:
parsing the subtitle information, to obtain a correspondence list of the plurality of subtitle segments of the subtitle information and time tags; and
querying for the time tag corresponding to the selected subtitle segment according to the correspondence list, to obtain the playing start time of the selected subtitle segment.

3. The method according to claim 1, wherein,
it is determined that a row of subtitles are the selected subtitle segment on triggering the skip option, in a case that the subtitle alignment indicatrix corresponds to the row of subtitles;
it is determined that one of two adjacent rows of subtitles are the selected subtitle segment on triggering the skip option, in a case that the subtitle alignment indicatrix corresponds to a blank area between the two adjacent rows of subtitles; or
it is determined that a paragraph of subtitles are the selected subtitle segment on triggering the skip option, in a case that the subtitle alignment indicatrix corresponds to the paragraph of subtitles.

4. The method according to claim 1, further comprising:
stopping displaying the subtitle alignment indicatrix and the skip option in a case that the skip option is not triggered within a predetermined duration after the drag operation is finished.

5. The method according to claim 1, wherein the skip option is arranged on the left or right of the subtitle alignment indicatrix.

6. An apparatus for controlling multimedia playing, comprising one or more processors and a storage medium in which operation instructions are stored, wherein the one or more processors are configured to perform the following steps when the operation instructions in the storage medium are executed:
dividing subtitle information of a multimedia file into a plurality of subtitle segments, wherein each of the plurality of subtitle segments corresponds to a time tag;
performing a drag operation on a subtitle display interface and displaying a subtitle alignment indicatrix and a skip option at a specified position on the subtitle display interface in a process of displaying the subtitle information, wherein the subtitle alignment indicatrix is used to highlight a subtitle segment corresponding to the skip option, and wherein in displaying a subtitle alignment indicatrix and a skip option at a specified position on the subtitle display interface in a process of displaying the subtitle information, the one or more processors are configured to displaying prompting text information near the subtitle alignment indicatrix and the skip option within a predetermined duration after displaying the subtitle alignment indicatrix and the skip option;
triggering the skip option and determining the subtitle segment corresponding to the skip option to be the selected subtitle segment;
obtaining a playing start time of the selected subtitle segment according to a time tag corresponding to the selected subtitle segment; and
playing the multimedia file from the playing start time.

7. The apparatus according to claim 6, wherein in obtaining a playing start time of the selected subtitle segment according to the time tag corresponding to the selected subtitle segment, the one or more processors are configured to perform the following:
parsing the subtitle information, to obtain a correspondence list of the plurality of subtitle segments of the subtitle information and time tags; and
querying for the time tag corresponding to the selected subtitle segment according to the correspondence list, to obtain the playing start time of the selected subtitle segment.

8. The apparatus according to claim 6, wherein the one or more processors are further configured to perform the following:
determining a row of subtitles to be the selected subtitle segment on triggering the skip option, in a case that the subtitle alignment indicatrix corresponds to the row of subtitles;
determining one of two adjacent rows of subtitles to be the selected subtitle segment on triggering the skip option, in a case that the subtitle alignment indicatrix corresponds to a blank area between the two adjacent rows of subtitles; or
determining a paragraph of subtitles to be the selected subtitle segment on triggering the skip option, in a case that the subtitle alignment indicatrix corresponds to the paragraph of subtitles.

9. The apparatus according to claim 6, wherein the one or more processors are further configured to perform the following:
stopping displaying the subtitle alignment indicatrix and the skip option in a case that the skip option is not triggered within a predetermined duration after the drag operation is finished.

10. The apparatus according to claim 6, wherein the skip option is arranged on the left or right of the subtitle alignment indicatrix.

11. A non-transitory computer readable medium in which computer executable instructions are stored, wherein the following steps are performed when the executable instructions are executed by a computer:

dividing subtitle information of a multimedia file into a plurality of subtitle segments, wherein each of the plurality of subtitle segments corresponds to a time tag;

performing a drag operation on a subtitle display interface and displaying a subtitle alignment indicatrix and a skip option at a specified position on the subtitle display interface in a process of displaying the subtitle information, wherein the subtitle alignment indicatrix is used to highlight a subtitle segment corresponding to the skip option, and wherein the displaying a subtitle alignment indicatrix and a skip option at a specified position on the subtitle display interface in a process of displaying the subtitle information comprises: displaying prompting text information near the subtitle alignment indicatrix and the skip option within a predetermined duration after displaying the subtitle alignment indicatrix and the skip option;

triggering the skip option and determining the subtitle segment corresponding to the skip option to be the selected subtitle segment;

obtaining a playing start time of the selected subtitle segment according to a time tag corresponding to the selected subtitle segment; and playing the multimedia file from the playing start time.

\* \* \* \* \*